April 28, 1942. A. C. BOWERS Re. 22,080

TIRE MANUFACTURE

Original Filed Dec. 13, 1937 3 Sheets-Sheet 1

INVENTOR.
Archibald C. Bowers
BY Christy and Wharton
ATTORNEYS.

April 28, 1942. A. C. BOWERS Re. 22,080
TIRE MANUFACTURE
Original Filed Dec. 13, 1937 3 Sheets-Sheet 2
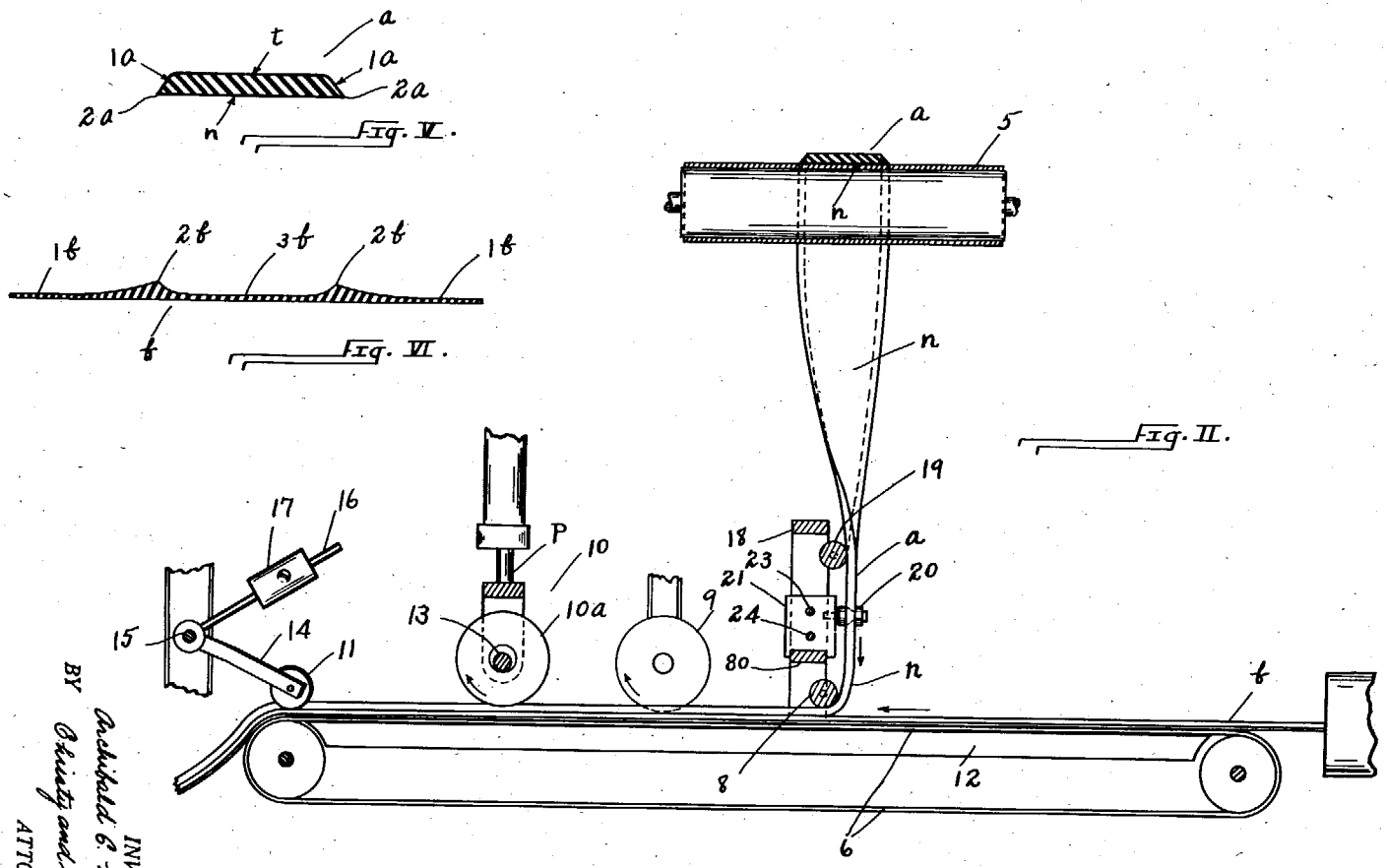
INVENTOR.
Archibald C. Bowers
BY Christy and Wharton
ATTORNEYS.

April 28, 1942. A. C. BOWERS Re. 22,080
TIRE MANUFACTURE
Original Filed Dec. 13, 1937 3 Sheets-Sheet 3
Fig. III.
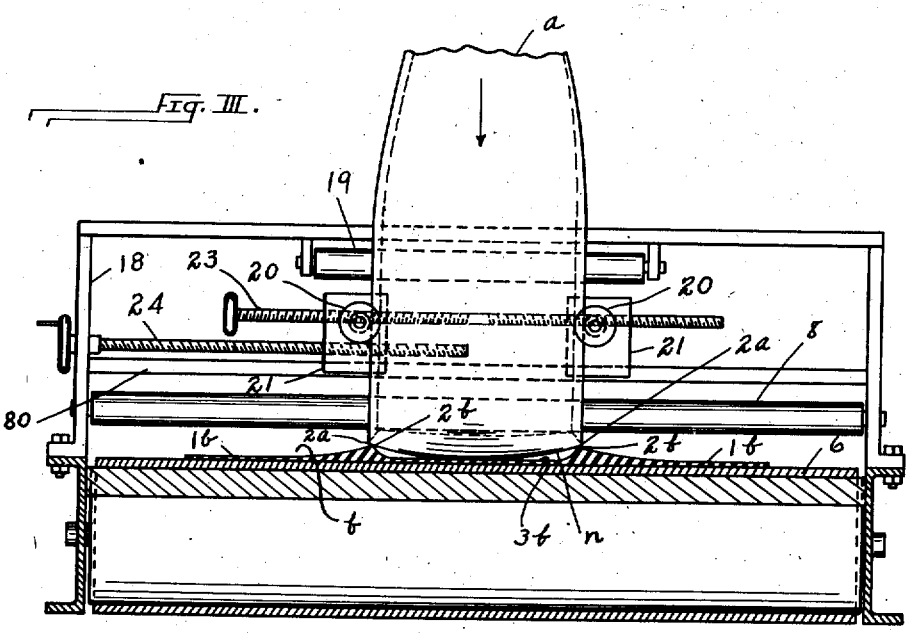
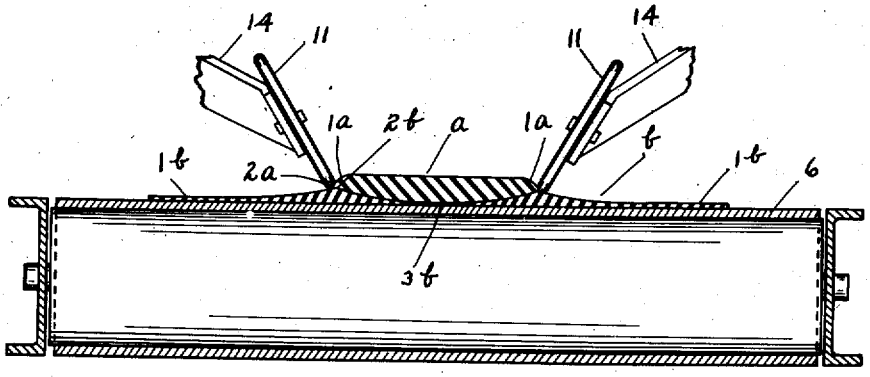
Fig. IV.
INVENTOR.
Archibald C. Bowers
BY Christy and Wharton
ATTORNEYS.

Reissued Apr. 28, 1942 Re. 22,080

UNITED STATES PATENT OFFICE 22,080

TIRE MANUFACTURE

Archibald C. Bowers, Akron, Ohio, assignor to Pennsylvania Rubber Company, a corporation of Pennsylvania Original No. 2,230,072, dated January 28, 1941, Serial No. 179,415, December 13, 1937. Application for reissue December 2, 1941, Serial No. 421,340

3 Claims. (Cl. 154—9)

Figure 1:
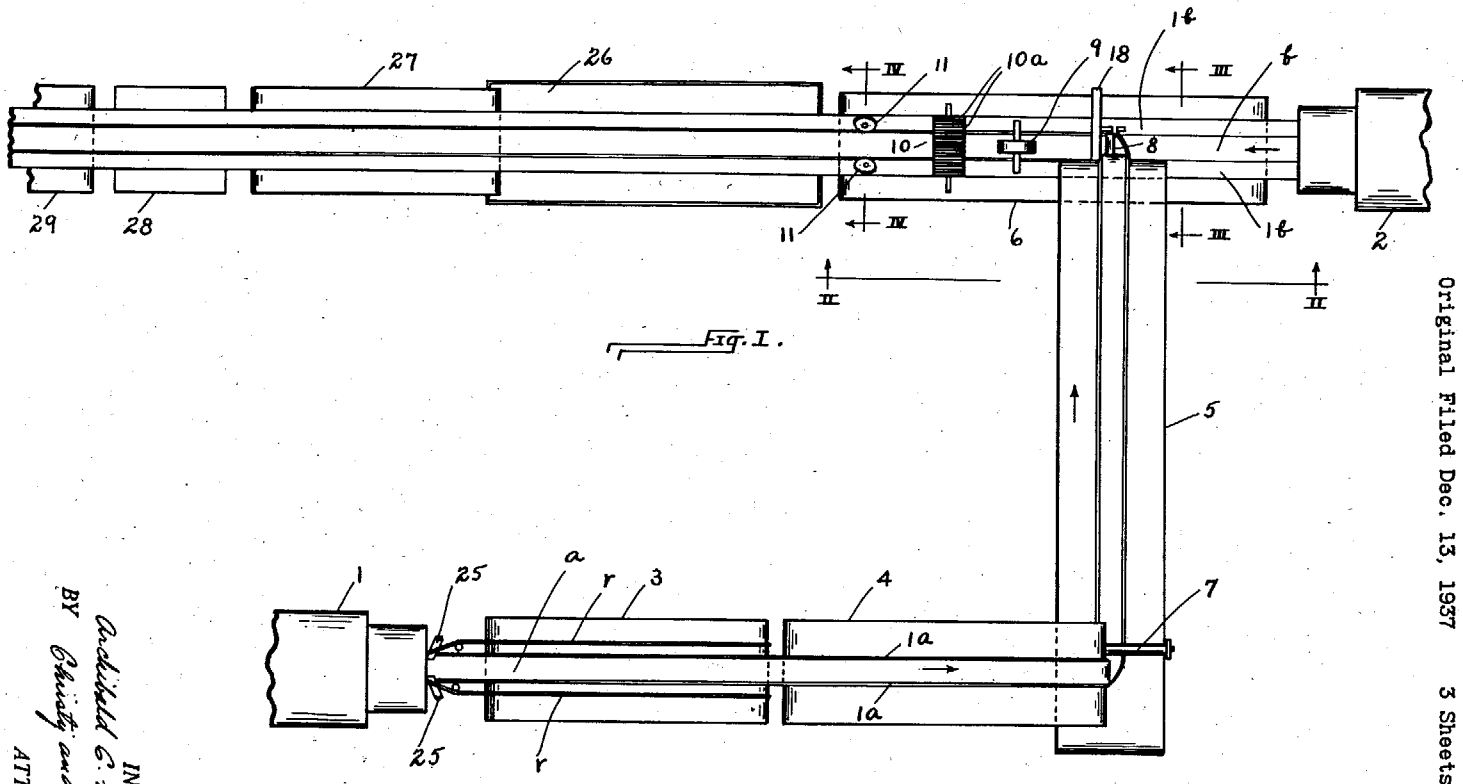

My invention relates to the manufacture of pneumatic tires for automobiles and other vehicles, and, more specifically, to drum-built tires.

In accordance with prevailing practice, the tread and outer side walls of a tire are formed as an extruded strip of raw rubber which, cut to proper length, is applied upon and vulcanized to the usual fabric carcass of the tire.

The rubber of which the tread of a tire is formed is essentially a relatively hard, wear-resisting rubber, while in the side walls of the tire the rubber is preferably a softer and more elastic rubber. For this reason it is customary to form the extruded rubber strip, mentioned above, of two different rubber compositions. The medial, relatively thick body portion of the strip—the portion that forms the tread in the finished article—is made of a different rubber composition than the relatively thin side margins of the strip that in the finished article provide the rubber facings for the side walls of the tire. The strip, so constituted, is manufactured in a continuous extruding process, and is cut into desired lengths for use in the construction of tires.

The machines for manufacturing such strips are costly. They are elaborate extruding machines which simultaneously extrude two mixes or grades of uncured rubber into two strip sections and, with uninterrupted continuity of operation, unite the sections face to face and extrude them into a composite strip of desired form. Such machines do not lend themselves readily to adjustment and interchangeability of extruding heads and dies, for the manufacture of strips of various sizes.

In accordance with my invention, the extruding machine consists in two simple extruding units, each unit extruding one of the strip-forming sections of rubber. In continuous operation the two strip sections are led from the extruding units and accurately assembled and united. The invention consists both in method and in apparatus, and by virtue of the invention various sizes of strips may be readily made in a single installation of the apparatus, it being understood that in unspecialized extruding machines or units of the sort I use the extruding heads and dies may be changed readily and quickly. Additionally, the strips produced in my apparatus are more uniform, and structurally superior to those made hitherto.

In the accompanying drawings, I illustrate apparatus in which and in the operation of which the invention is realized. Fig. I is a diagrammatic view in plan of such apparatus; Fig. II is a fragmentary view, showing to larger scale certain parts of the apparatus in side elevation and other parts in vertical section, on the plane II—II of Fig. I; Figs. III and IV are views in vertical section of particular parts of the apparatus to still larger scale, the plane of section of Fig. III being indicated at III—III and that of Fig. IV at IV—IV in Fig. I; Fig. V is a view in cross-section of one of the strip sections of which the composite strip is formed, and Fig. VI is a similar view of the other strip section.

Referring to the drawings, my apparatus includes two rubber-extruding units, each of well-known simple construction. The two extruding units, 1 and 2, are indicated fragmentarily in Fig. I; they are spaced apart and in this case are out of alignment, better to permit of organization with aparatus presently to be described. The extruding unit 1, equipped with proper extruding head and dies, extrudes rubber in continuous length into a strip *a*. In the finished article the strip *a* forms the tread of the tire, and the rubber introduced to the machine 1 is of such mix that, when shaped and vulcanized on the tire, it provides the essential tough, wear-resisting tread. In the extruding unit 2, rubber is extruded in continuous length into a strip *b* that in the finished article covers the side walls of the tire. The rubber of which strip *b* is formed is of such mix that, when applied and vulcanized to the carcass of a tire, it provides the desired soft and highly elastic covering on the side walls of the tire.

The strips *a* and *b* are shown in cross-section in Figs. V and VI, respectively. The body of the strip *b* includes two marginal portions 1*b* that are relatively thin at their outer edges and increases in thickness towards the center of the strip, with maximum thickness reached in ridges 2*b* on the upper face of the strip. The two marginal portions 1*b* of the strip are interconnected by an intermediate web portion 3*b*; the web portion 3*b* falls away sharply in thickness from the ridges 2*b* and provides a thin-bottomed channel in which the strip *a* is compressed, with union of the two bodies. As presently will appear in greater detail, the body of the strip *a* is relatively thick with respect to the strip *b*, and its opposite sides 1*a* are tapered to sharply feathered edges 2*a*.

The strips *a* and *b* are assembled and united in continuous operation. Specifically, the strip *a*, advancing from the extruding machine 1, is by three endless conveyors 3, 4 and 5 carried to the strip *b* advancing from machine 2. The advancing strip *b* is supported and carried forward upon a horizontal conveyor 6, arranged below the discharge end of conveyor 5. The conveyor 3 leads the strip *a* in horizontal course from the extruding machine 1; the conveyor 4 carries the strip upward from conveyor 3, and feeds it downward to the conveyor 5 which, as shown in Fig. I, extends at right angles to the aligned conveyors 3 and 4. It is important to note that the nether surface *n* of the strip *a* leaving the machine 1 is the surface that in the assembled structure is united with strip *b*; in descending from the upper end of conveyor 4 to the conveyor 5 the strip *a* passes beneath a roller 7, and in the course of such movement between conveyor 4 and roller 7 the body of the descending strip twists through 90 degrees; and thus the said surface *n* of the strip passing beneath the roller 7 is presented downward upon the conveyor 5. At the discharge end of conveyor 5 the advancing strip again descends and again the descending body of the strip twists or turns through 90 degrees. Immediately above the surface of the conveyor 6 the strip passes beneath a roller 8 and into contact with the strip *b* advancing on such conveyor. The extruding units 1 and 2 and the conveyors of the system operate at such speed that the two strips *a* and *b* advance beneath the roller 8 at uniform velocity, and are assembled in the manner indicated in Fig. III, with the surface *n* of the strip *a* meeting the upper surface of the strip *b* between the ridges 2*b*, 2*b*.

Manifestly, the strips must be accurately centered with respect to one another, and to such end I secure the roller 8 against axial displacement in a stationary frame 18 that bridges the conveyor, as shown in Fig. III. At a substantial interval above the roller 8, I mount a roller 19 in the frame, and between the two rollers I provide grooved wheels 20 that engage the opposite edges of the descending strip *a* and insure accuracy of alignment of the two advancing and meeting strips. As may be perceived in Fig. II, the roller 19 serves to take the twist out of the strip moving downward from the conveyor 5, and guides the descending strip into a plane that is normal both to the surface of the conveyor 6 and to the line of advance of strip *b*, with the consequence and effect that the grooved wheels 20 and the roller 8 are more effective in directing the strip *a* into desired assembly with strip *b*.

Advantageously, the grooved wheels or rollers 20 are severally mounted on blocks 21; the blocks 21 are carried on a rigid slide-bar 80 secured in the frame 18; and a screw shaft 23 extends through and in threaded engagement with the blocks. Outward from its center the shaft 23 is oppositely threaded, so that the interval between the two blocks may (by rotation of the shaft in one direction or the other) be varied, to adjust the rollers 20 for strips of different widths. A threaded shaft 24, mounted in the frame and engaging one of the blocks 21, affords unit adjustment of the two blocks relatively to the center of the conveyor.

It will be understood that the surfaces of the extruded rubber strips *a* and *b* are tacky and sticky, as the surfaces of extruded rubber articles ordinarily are before final vulcanizing, and by virtue of such tackiness the two strips may be readily joined together and bonded, under the influence of applied pressure. My apparatus embodies particularly effective means to this end.

More specifically, I provide a relatively narrow roller 9, a relatively wide roller 10, and a pair of stitching wheels 11, 11. As the assembled strips *a* and *b* pass in continuous course from beneath the roller 8, they are subjected in turn to the roller 9, roller 10, and wheels 11, 11. The relatively narrow roller 9 bears centrally upon the advancing strips, and presses the central portion of strip *a* into rubber-bonding engagement with the medial web 3*b* of strip *b*, it being noted that a rigid platen 12 (Fig. II) reinforces the upper reach of conveyor 6, so that the two bodies of rubber traveling beneath the roller 9 are pinched and compressed in such manner as to effect the desired bond. As the two strips are thus brought together and by the roller 9 centrally united on an area of less width than the narrower strip, air is expelled laterally from between the strips. Upon moving from beneath the roller 9, the strips pass beneath roller 10. The roller 10 consists in an assembly of metal disks 10*a* upon a shaft 13, and a pneumatic plunger P (Fig. II) is arranged to exert thrust on the shaft, forcing the disk roller into rubber-compressing contact with the strip *a*. Under the pressure of the roller disks 10*a*—a pressure effective on lines of contact rather than on a surface of contact—all air remaining between strips is expelled and the bonding of the strips is completed across the entire width of the strip *a*. In such assembling and bonding of the strips, the cross-sectional shapes of the individual strips are modified. Before assembly and integration the strips have the cross-sectional shapes shown in Figs. V and VI, respectively, whereas after assembly the medial body portion of strip *b* and the lower body portion of strip *a*, having mutually yielded under the compression of rollers 9 and 10, are modified in form, as illustrated in Fig. IV.

Upon passing from the disk roller 10, the assembled strips advance under the wheels 11, 11, and under the pressure of such wheels the opposite edges 1*a* of the strip *a* are securely bonded or stitched, in closed pencil-line seams, to the underlying body of the strip *b*. Each wheel is mounted on the distal end of an arm 14 secured to and extending from a rotary shaft 15 (Fig. II); a bar 16 extends upward from the shaft 15, and, as shown, carries a weight 17 which is effective (through the shaft 15 and arms 14) to press the wheels 11 against the assembled strips. The arms 14 are adjustable axially of the shaft, to vary the interval between the stitching wheels for strips of various sizes.

As illustrated in Fig. IV, each wheel 11 comprises a thin disk whose periphery is transversely curved on small radius; the wheels are inclined at approximately 60° to the horizontal face of conveyor 6, and they are so positioned transversely of the conveyor that their peripheries bear upon the edges 1*a* of the assembled strip *a* and unite such edges to the strip *b*. To the end that the seams shall be perfect, eliminating all crevices and fissures in which foreign particles might otherwise accumulate, two features of my invention are particularly important.

1. The opposite edges of the strip *a* are feathered; that is, the sides 1*a* of the strip are beveled downward and outward (Fig. V) from the top surface *t* of the strip, and meet the nether surface *n* in thin, sharply defined edges 2*a*. The means for providing such feathered edges are described in application for Letters Patent, Serial No. 179,390, filed December 13, 1937, by Walter E. Humphrey, now Patent No. 2,218,751, dated October 22, 1940, and suffice it herein to say that a pair of knives 25 (Fig. I) is arranged at the mouth of the machine 1, to trim the edges of the continuously extruded strip. The trimmed-away rubber is parted from the body of the strip and carried in the form of ribbons or strings *r* to the discharge end of the conveyor 3, whence it descends into a suitable receptacle (not shown).

2. The width of the strip *a* on its under side is slightly but sufficiently greater than the interval between the ridges 2*b* on the strip *b*, so that in the assembled strips the feathered edges of strip *a* project laterally outward (in this case $\frac{1}{32}''$) from the crests of said ridges on strip *b*.

By virtue of these two features, the stitching wheels 11 effect a perfect integration of the edges of strip *a* with the body of strip *b*. In Fig. IV it will be perceived that the peripheries of the wheels 11, rotating tangentially upon the advancing strip assembly *a,b*, press the feathered edges 1*a* into the surface of strip *b*, and stitch the edges 1*a* to the body of strip *b* in seams that extend parallel to, and lie laterally outward from, the crests of ridges 2*b*. Thus, as shown in Fig. IV, the crests of the ridges 2*b* on the strip *b* are overlapped and enclosed by the feathered edges of strip *a*, whereby a perfect union of the two strips is obtained. It is impossible for dust or other foreign particles to enter between the assembled strips.

Upon advancing from beneath the stitching wheels 11, the strip assembly proceeds in uninterrupted course through a water bath 26 (Fig. I), over a conveyor 27 to scales 28, and from such scales to a conveyor 29, whence it is led through a second water bath, or otherwise treated in accordance with recognized good practice, preparatory to its use in the construction of tires.

Thus, I form rubber of tough mix and rubber of elastic mix into a composite strip for use in the construction of tires.

Those skilled in the art will understand that the extruding heads and dies of the extruding units 1 and 2 may be readily and quickly changed, and I have described the adjustability of the stitching wheels 11, 11 and the strip-guiding rollers and wheels in frame 18. Manifestly, the apparatus is readily adaptable to the manufacture of strips for various sizes of tires. In the operation of such apparatus the method of the invention may be practised.

I claim as my invention:

1. Apparatus for the manufacture of a composite strip of rubber, said apparatus including two units for severally extruding two rubber compositions into two strips of complementary shapes, one relatively wide with respect to the other, means organized with one of said extruding units for feathering the side edges of the narrower strip, means for bringing the strips advancing severally from said extruding units into superposed relation, means arranged to exert on the advancing superposed strips a rubber-bonding pressure for effecting integration of the bodies of the assembled strips on the area between the feathered edges of the narrower strip, and means for stitching said feathered edges of the narrower strip to the body of the wider strip.

2. The method of producing a composite strip of which to form the side-wall and tread of a tire, which method consists in shaping the side-wall portion of the strip with lateral ridges and an intervening valley, forming the tread portion of the strip with a width exceeding the space between the ridges in the side-wall portion, and feathering the side edges of said tread portion, assembling the two strip portions progressively, with the feathered edges of the tread portion positioned upon the ridges of the side-wall portion, and under rubber-bonding stress progressively pressing the tread portion into the valley between the ridges of said side-wall portion and shaping the body of such tread portion to the body of said side-wall portion within said valley, and then stitching the feathered edges of the tread portion over the crests of the ridges on the side-wall portion.

3. In apparatus for forming composite strip that goes to the making-up of the tread and side-wall of a drum-wheel tire, the combination of two rubber-extruding units provided with dies adapted to extrude to complementary shapes the tread portion and side-wall portion of said strip, and means for progressively uniting the independently-formed portions of the strip comprising two endless traveling conveyors adapted to receive the strip portions severally from the extruding units and to advance said strip portions at substantially uniform velocity, one of said conveyors arranged above the other and adapted progressively to deliver the strip portion carried thereby downward and in longitudinally aligned position upon the strip portion advancing upon the other conveyor, two strip-aligning guides engaging the opposite side edges of the downwardly moving strip portion, said guides being adjustable transversely of the line of descent of the engaged strip and relatively to each other.

ARCHIBALD C. BOWERS.